United States Patent
Burd et al.

(10) Patent No.: US 9,964,214 B2
(45) Date of Patent: May 8, 2018

(54) SEAL WITH NON-METALLIC INTERFACE

(75) Inventors: Steven W. Burd, Cheshire, CT (US);
Roger W. Bursey, Jupiter, FL (US);
Gonzalo F. Martinez, Stuart, FL (US);
Meggan H. Harria-Miller, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 474 days.

(21) Appl. No.: 13/437,513

(22) Filed: Apr. 2, 2012

(65) Prior Publication Data
US 2013/0256993 A1    Oct. 3, 2013

(51) Int. Cl.
| | | |
|---|---|---|
| *F16J 15/00* | (2006.01) | |
| *F16J 15/08* | (2006.01) | |
| *F01D 15/12* | (2006.01) | |
| *F02K 3/072* | (2006.01) | |
| *F02C 3/067* | (2006.01) | |
| *F02C 7/36* | (2006.01) | |

(52) U.S. Cl.
CPC .......... *F16J 15/0887* (2013.01); *F01D 15/12* (2013.01); *F02C 3/067* (2013.01); *F02C 7/36* (2013.01); *F02K 3/072* (2013.01); *Y02T 50/672* (2013.01)

(58) Field of Classification Search
CPC ...... F16J 15/0887; F16J 15/104; F16J 15/061; F01D 15/12; F02C 3/067; F02C 7/36; F02K 3/072; Y02T 50/672
USPC .......................... 277/644, 650, 652–654, 500
See application file for complete search history.

(56) References Cited

U.S. PATENT DOCUMENTS

| | | | |
|---|---|---|---|
| 4,022,948 A * | 5/1977 | Smith et al. ............... | 428/542.8 |
| 4,072,372 A * | 2/1978 | Korrenn et al. ............. | 384/213 |
| 4,114,248 A * | 9/1978 | Smith et al. .................... | 29/460 |
| 4,645,217 A * | 2/1987 | Honeycutt et al. ........... | 277/555 |
| 4,681,651 A * | 7/1987 | Brozovic et al. ............. | 156/382 |
| 5,222,692 A * | 6/1993 | Glowacki .................. | 244/53 R |
| 5,657,998 A | 8/1997 | Dinc et al. | |
| 5,807,072 A | 9/1998 | Payling | |
| 6,415,599 B1 * | 7/2002 | Ausdenmoore et al. ....... | 60/230 |
| 6,736,401 B2 | 5/2004 | Chung et al. | |
| 2005/0067793 A1* | 3/2005 | Klenk et al. .................. | 277/549 |

(Continued)

FOREIGN PATENT DOCUMENTS

FR    2789144    8/2000

OTHER PUBLICATIONS

International Search Report and Written Opinion for International Application No. PCT/US213/034304 dated Jan. 15, 2014.

(Continued)

*Primary Examiner* — Nathan Cumar
(74) *Attorney, Agent, or Firm* — Carlson, Gaskey & Olds, P.C.

(57) ABSTRACT

A seal for use between a first duct and a second duct and, the ducts having relative motion therebetween, includes a first plurality of fingers for attachment to the first duct to be disposed about one of the first duct and the second duct, a seal land attaching to about an other of the first duct and the second duct, and a seal attaching to the seal land and in contact with the plurality of fingers wherein one of the plurality of fingers and the seal is metallic and an other of the seal land or the plurality of fingers is non-metallic.

24 Claims, 2 Drawing Sheets

(56) References Cited

U.S. PATENT DOCUMENTS

| | | |
|---|---|---|
| 2006/0012133 A1 | 1/2006 | Strait |
| 2006/0197287 A1 | 9/2006 | Farah et al. |
| 2008/0084030 A1 | 4/2008 | Wilson, Jr. |
| 2010/0066032 A1 | 3/2010 | Girman et al. |

OTHER PUBLICATIONS

International Preliminary Report on Patentability for PCT Application No. PCT/US2013/034304, dated Oct. 16, 2014.
Extended European Search Report for European Application No. 13813501.7, dated Jan. 26, 2016.

* cited by examiner

SEAL WITH NON-METALLIC INTERFACE

STATEMENT REGARDING FEDERALLY SPONSORED RESEARCH OR DEVELOPMENT

The government may have certain rights to this invention pursuant to Contract No. N00019-02-C-3003 awarded by the United States Navy.

BACKGROUND

This invention generally relates to a seal between a fixed member and a movable member. More particularly, this invention relates to a finger seal between relatively moveable ducts.

A gas turbine engine typically includes an exhaust duct for directing exhaust gases. Many exhaust duct assemblies include a movable portion for selectively directing the exhaust gases. Such exhaust duct assemblies includes a fixed portion and a movable portion. A seal is required between the fixed and movable portions to prevent intrusion of exhaust gases through the exhaust nozzle assembly at the interface between the fixed and movable portions.

A seal may be provided by a plurality of fingers that are defined by a corresponding plurality of slots. The slots and finger configuration provide for flexing and expansion of the movable member relative to the fixed portion. Known seals utilize staggered overlapping configurations to prevent leakage.

Finger seals are often fabricated in sheet metal and are comprised of machined or photo-etched finger shapes attached to or integral to thin metal laminate rings, stacking the laminates so that the fingers of one laminate overlap the fingers of the adjacent laminates. The stack is held together with mechanical or bonding means including rivets and fasteners.

A finger seal consists of long, pointed "fingers" angled in the direction of the sealing surface or the rotation in applications involving enclosed shafts. Gaps between the fingers allow each finger to flex in response to thermal, dynamic and/or vibratory loads between the two components.

Wear can occur between the fingers and lands that interact with the fingers.

SUMMARY

According to an embodiment disclosed herein, a seal for use between a first duct and a second duct and, the ducts having relative motion therebetween, includes a first plurality of fingers for attachment to the first duct to be disposed about one of the first duct and the second duct, a seal land attaching to about an other of the first duct and the second duct, and a seal attaching to the seal land and in contact with the plurality of fingers wherein a first surface of one of the plurality of fingers and the seal is metallic and a second surface of an other of the seal land or the plurality of fingers is non-metallic.

In a non-limited embodiment of any of the foregoing seal embodiments, the plurality of fingers is metallic and the seal is polytetrafluoroethylene-based.

In a further non-limited embodiment of any of the foregoing seal embodiments, the seal is comprised of any of carbon, silicone, ceramic or composite-based materials.

In a further non-limited embodiment of any of the foregoing seal embodiments, the plurality of fingers is metallic.

In a further non-limited embodiment of any of the foregoing seal embodiments, the seal further comprises a second plurality of fingers disposed over the first plurality of fingers.

In a further non-limited embodiment of any of the foregoing seal embodiments, the second plurality of fingers covers a gap between adjacent fingers of the first plurality of fingers.

In a further non-limited embodiment of any of the foregoing seal embodiments, one of the first plurality of fingers has an elbow and an extension extending upwardly at an angle from the elbow.

In a further non-limited embodiment of any of the foregoing seal embodiments, the angle is approximately 135 degrees±15 degrees.

In a further non-limited embodiment of any of the foregoing seal embodiments, the extension has a radially outer non-flat surface.

In a further non-limited embodiment of any of the foregoing seal embodiments, the seal further comprises a second plurality of fingers overlapping the first plurality of fingers wherein one of the second plurality of fingers has a radially inner surface mating with the radially outer non-flat surface.

In a further non-limited embodiment of any of the foregoing seal embodiments, the extension terminates in a curvilinear shape.

In a further non-limited embodiment of any of the foregoing seal embodiments, the seal further comprises a second plurality of fingers overlapping the first plurality of fingers wherein one of the second plurality of fingers terminates in a shape that mates with a portion of the curvilinear shape.

According to a further embodiment disclosed herein, a gas turbine engine seal for use between a first duct and a second duct in the gas turbine engine, the ducts having relative motion therebetween, the seal including a first plurality of fingers for attachment to the first duct to be disposed about one of the first duct and the second duct, a seal land attaching to about an other of the first duct and the second duct, and a seal attaching to the seal land and in contact with the plurality of fingers wherein a first surface of one of the plurality of fingers and the seal is metallic and a second surface of an other of the seal land or the plurality of fingers is non-metallic.

In a further non-limited embodiment of any of the foregoing seal embodiments, the plurality of fingers is metallic and the seal is polytetrafluoroethylene-based.

In a further non-limited embodiment of any of the foregoing seal embodiments, the seal is comprised of any of carbon, silicone, ceramic or composite-based materials.

In a further non-limited embodiment of any of the foregoing seal embodiments, one of the first plurality of fingers has an elbow and an extension extending upwardly at an angle from the elbow.

In a further non-limited embodiment of any of the foregoing seal embodiments, the extension has a radially outer non-flat surface.

In a further non-limited embodiment of any of the foregoing seal embodiments, the extension terminates in a curvilinear shape.

In a further non-limited embodiment of any of the foregoing seal embodiments, the second surface is a polytetrafluoroethylene-based fabric.

In a further non-limited embodiment of any of the foregoing seal embodiments, the second surface is a polytetrafluoroethylene-based fabric that is bonded to one of the one of the plurality of fingers or the seal land in register with an elbow of the plurality of fingers.

DESCRIPTION OF THE DRAWINGS

The various features and advantages of the disclosed examples will become apparent to those skilled in the art from the detailed description. The figures that accompany the detailed description can be briefly described as follows.

DETAILED DESCRIPTION

Figure 1:
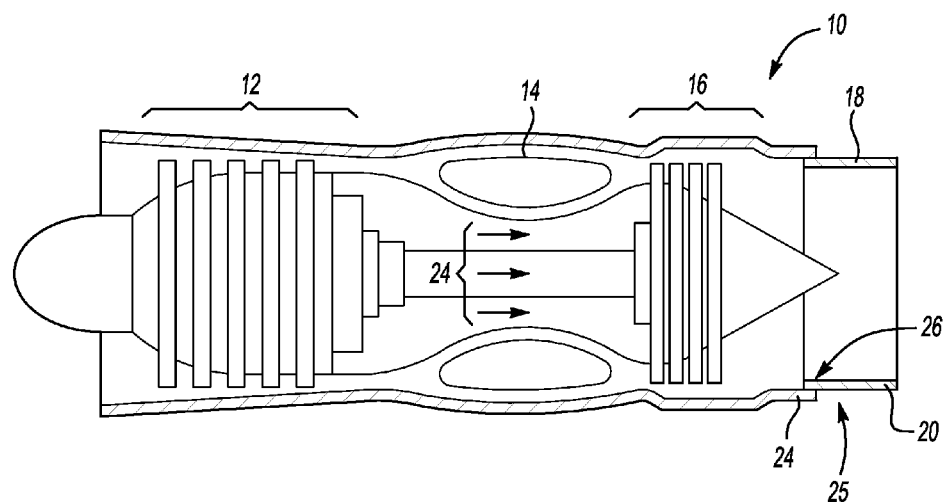
FIG. 1 is a schematic depiction of a jet engine in which finger seals are disclosed.

Referring to FIG. 1, a machine, such as a gas turbine engine assembly 10, includes a compressor 12 for compressing incoming air. Compressed air is mixed with fuel in a combustor 14 and ignited to generate an axial flow of hot exhaust gases 24. The hot exhaust gases drive a turbine 16 that in turn drives the compressor 12. An exhaust duct assembly 18 directs the outgoing exhaust gases 24 from the gas turbine engine assembly 10. The exhaust duct assembly 18 includes a fixed part 22 and a movable part 20 for selectively directing exhaust gases 24. The interface 25 between the fixed part 22 and movable part 20 includes a seal 26, as will be discussed infra, for substantially preventing leakage of exhaust gases radially from the exhaust duct assembly 18. One of ordinary skill in the art will recognize from the teachings herein that the seal 26 as described herein may be used in other areas of the gas turbine engine assembly 10 and other types of machinery where a finger seal 26 might be used.

The seal 26 includes a plurality of flexible members 34 or fingers that extend from the fixed part 22 towards and in contact with the moveable part 20. The flexible members 34 provide for expansion and contraction along with creating flexibility in the region of contact between a seal land 36 on the moveable part and the seal 26. As appreciated, although the seal 26 is shown mounted to the fixed part 22, it may also be fixed to the movable part 20 and contact a seal land on the fixed part 22.

The "finger seal" 26 provides air-to-air sealing for secondary flow control and gas path sealing in gas turbine engines. Although this seal 26 was developed for gas turbine engine assemblies 10, it can be used in any machinery in which a relatively higher pressure air cavity is to be sealed from a relatively lower pressure air cavity, for both static and rotating applications, and/or in applications in which adjacent components require a flexible interface due to displacement, vibration, or relative thermal growth. Long-life, low-leakage finger seal provide many benefits for propulsion gas turbine engines, including cost (relative to alternatives), design flexibility and secondary flow management.

It has been discovered that finger seals of the prior art (not shown) may wear into a sealing surface (as will be discussed infra), the sealing surface may wear into the finger seals or the both surfaces wear into each other during use. The wear can lead to premature seal durability issues, reduce the longevity and effectiveness or both components and be detrimental to the application in which the seals are used. To improve the wear characteristics, seal and sealing surfaces are often produced with surface coatings or hard coats. Such coating applications may be beneficial but do not mitigate the problematic wear and still involve metal-to-metal interfaces.

Figure 2:
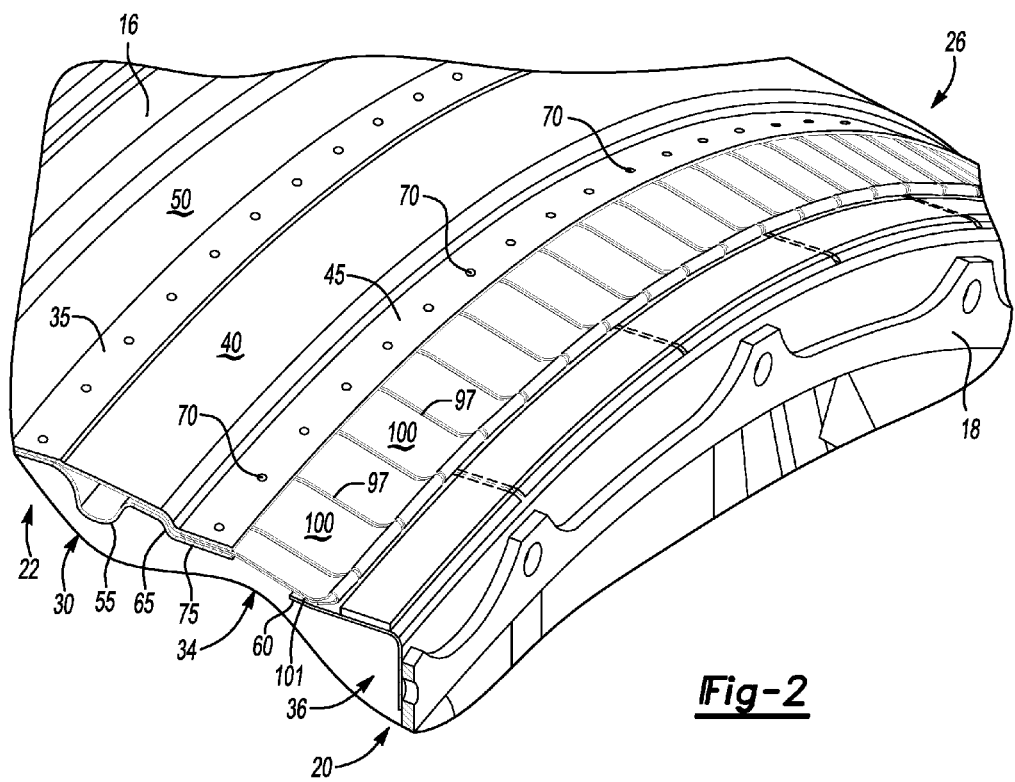
FIG. 2 is a respective, cross-sectional view of the seal structure of FIG. 1.

Referring now to FIG. 2, an extension 30 attaches to turbine casing 50 (e.g. the stationary portion 22), has a flat circumferential section 35, a tapered adjusting section 40, and a first clamping area 45. The adjusting section 40 is used to place the finger seals 26 at a proper position relative to an exhaust nozzle or duct 18 that may have varying diameters on different engine platforms (not shown). As shown, the adjusting section 40 tapers radially inwardly from the casing 50 to the duct 18, however it is conceivable it would taper radially outwardly in other cases. The first clamping area 45 is roughly in parallel to the casing 50.

The casing 50 has a conduit portion 55 that is defined by a loop 60 in the conduit portion 55. The conduit portion 55 also has a portion 65 mating with the adjusting section 40. The conduit portion 55 continues to a second clamp area 75 that is parallel to and in register with the first clamping area 45. The two clamp areas can be clamped together by rivets 70

Fingers 80 form a first layer 85, the first layer having a plurality of gaps 90, and form a second layer 95, the second layer having a plurality of gaps 97 between each finger 100. The fingers 80 of the first layer 85 and fingers 100 in the second layer 95 are outer register with each other so that the first layer gaps 90 do not align with the second layer gaps 100. By staggering the gaps 90, 100 leakage of air between the first and second layers 85, 95 is minimized. As is known in the art, a metal or fabric (not shown) may be disposed between the fingers to further minimize air leakage therebetween. The first layer 85 of fingers 80 define an elbow 101 for contacting with a seal 160 as will be discuss infra.

Each finger 80 in the first layer 85 has an irregularly-shaped, radially outwardly extending portion 110 (e.g., or non-flat or ridged shape) extending from the finger 100 at an angle of about 135°+15° and terminates in a first ovoid or curvilinear shape 111. Each finger 100 in the second layer 95 has a plurality of non-flat surfaces or ridges 115 on a radially-inward portion thereof and terminates at a second ovoid or curvilinear section 120. The second layer 95 mates with the first layer 85 such that the non-flat surface 110 mates with the non-flat surface 115. The first ovoid or curvilinear section 111 snaps on or otherwise mates with the second ovoid or curvilinear section 120. The non-flat surfaces 110, 115, and the first and second curvilinear surfaces 111, 120 essentially form a labyrinth seal 140 to further minimize leakage through the first layer 85 and the second layer 95.

Figure 3:
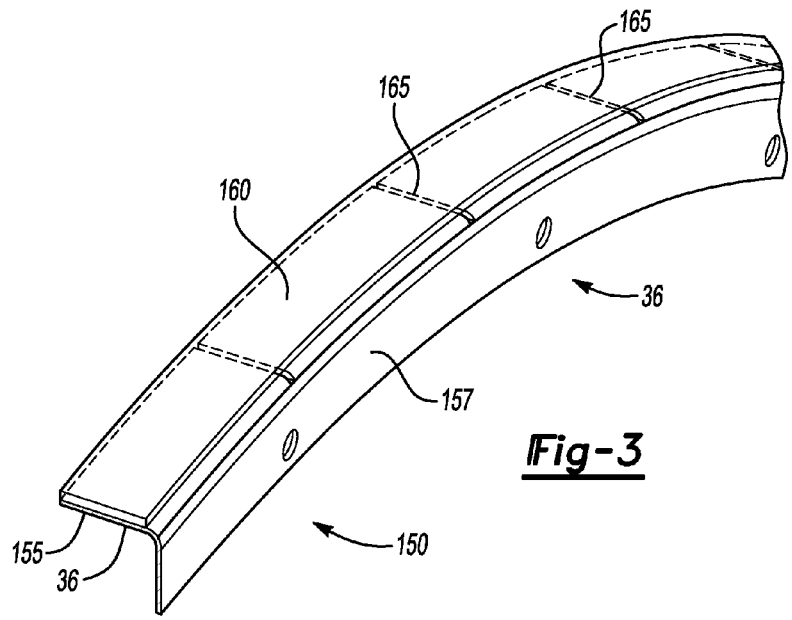
FIG. 3 is a cross-sectional view of the finger seal of FIG. 2.
Figure 4:
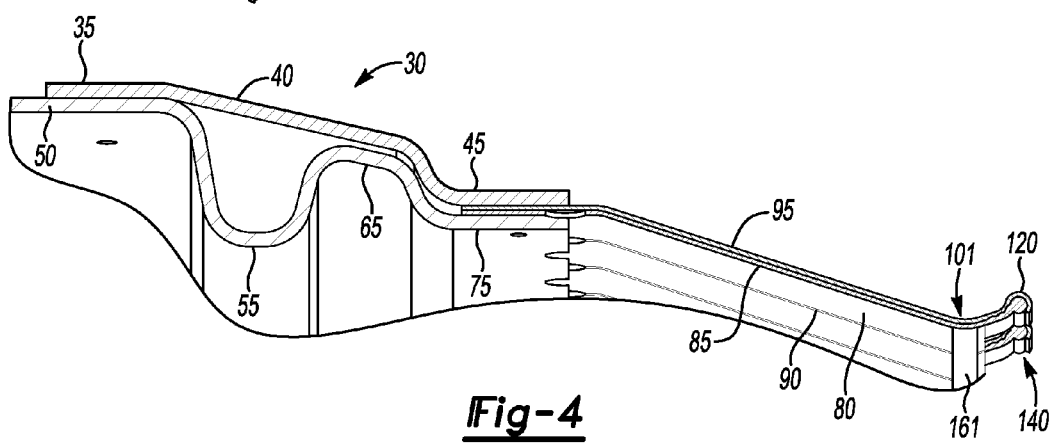
FIG. 4 is a perspective view of a portion of a seal land of FIG. 2.
Figure 5:
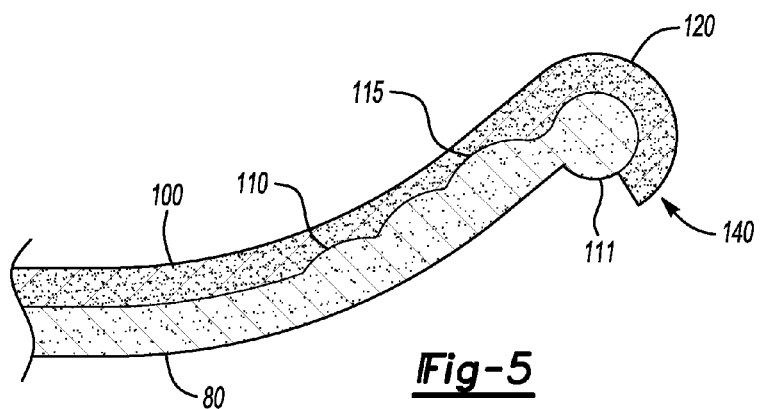
FIG. 5 is a cross-sectional view of the finger seal as shown in FIG. 3.

Referring to FIG. 3, a seal land 36 that is essentially an angle iron-shaped body 150 attaches to the exhaust duct 18 (see FIG. 2). The seal land 145 has a relatively flat circumferential surface 155 that is joined to a vertical attaching surface 157 that attaches conventionally to the exhaust duct 18. A seal 160 may be segmented (see dotted lines 165) or may be one piece. The seal may be mechanically attached to the seal land circumferential surface 155 or glued thereto. If the seal 160 is segmented, differences in temperature between an interior of the duct 151 and the exterior thereof may be absorbed by the gaps between each segment. The elbows 101 of the first layer 85 fit against the seal 160 (see FIG. 2). The seal 160 may be made of a polytetrafluoroethylene-based or a thermoplastic polymer and may also be a polytetrafluoroethylene-based fabric liner 160. As one of ordinary skill in the art will appreciate from the teachings herein, the fabric liner 161 (See also FIG. 4) may also be bonded to the fingers and the seal 160 may be metallic. The fabric liner is in register with the elbow 101.

The first layer of finger seals 85 and the second layer of the finger seals 95 are flexible and may also be made of a polytetrafluoroethylene-based or a thermoplastic polymer as well as metal. The metallic finger seal element interfaces with the non-metallic pads to provide a metallic to non-metallic wear interface to minimize premature wear of the seal land 36.

By using a slippery material relative to metal, it is less probably that the elbows 101 will seat themselves in the seal 160 thereby minimizing premature failure of the seal.

According to an alternative embodiment, the seal material may be secured to the fingers instead of or as well as the seal land. A further embodiment show the seal to be comprised as comprised of carbon, silicone, ceramic or composite-based materials because of their wear and lubricity characteristics. According to a further embodiment finger seals may be comprised of ceramic or composite-based materials.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A seal for use between a first duct and a second duct and, said ducts having relative motion therebetween, said seal comprising:
   a first plurality of fingers attached to said first duct, wherein a proximal end of each of said first plurality of fingers are rigidly fixed to and directly contact a surface on said first duct,
   a seal land attached to said second duct, the seal land is located radially inward from each of the first plurality of fingers relative to a longitudinal axis of the first duct, and
   a seal attached to said seal land, said seal directly contacts said plurality of fingers, wherein a first surface of one of said plurality of fingers or said seal is metallic and a second surface of an other of said seal or said plurality of fingers is non-metallic.

2. The seal of claim 1 wherein said second surface is a polytetrafluoroethylene-based fabric.

3. The seal of claim 1 wherein said seal is comprised of any of carbon, silicone, ceramic or composite-based materials and said plurality of fingers is metallic.

4. The seal of claim 1 further comprising a second plurality of fingers disposed over said first plurality of fingers.

5. The seal of claim 4 wherein said second plurality of fingers covers a gap between adjacent fingers of said first plurality of fingers.

6. The seal of claim 1 wherein one of said first plurality of fingers has an elbow and an extension extending upwardly at an angle from said elbow.

7. The seal of claim 6 wherein said angle is approximately 135 degrees+15 degrees.

8. The seal of claim 6 wherein said extension has a radially outer non-flat surface.

9. The seal of claim 6 further comprising a second plurality of fingers overlapping said first plurality of fingers wherein one of said second plurality of fingers has a radially inner surface mating with said radially outer non-flat surface.

10. The seal of claim 6 wherein said extension terminates in a curvilinear shape.

11. The seal of claim 10 further comprising a second plurality of fingers overlapping said first plurality of fingers wherein one of said second plurality of fingers terminates in a shape that mates with a portion of said curvilinear shape.

12. The seal of claim 1, wherein a distal end of each of said first plurality of fingers directly contact said seal.

13. The seal of claim 1, wherein said second duct is located radially inward from a downstream end of said first duct relative to a longitudinal axis of the first duct and a radially inner surface of said second duct forms a boundary defining an exhaust gas path.

14. The seal of claim 1, wherein the plurality of fingers form a ring having a substantially constant radial dimension.

15. A gas turbine engine seal for use between a first duct and a second duct in said gas turbine engine, said ducts having relative motion therebetween, said seal comprising:
   a first plurality of fingers attached to said first duct,
   a seal land attached to said second duct, the seal land is located radially inward from each of the first plurality of fingers relative to a longitudinal axis of the first duct, and
   a seal located directly on a surface of said seal land, said seal directly contacts said plurality of fingers, wherein a first surface of one of said plurality of fingers or said seal is metallic and a second surface of an other of said seal or said plurality of fingers is non-metallic.

16. The gas turbine engine seal of claim 15 wherein said plurality of fingers is metallic and said seal is polytetrafluoroethylene-based.

17. The gas turbine engine seal of claim 15 wherein said seal is comprised of any of carbon, silicone, ceramic or composite-based materials.

18. The gas turbine engine seal of claim 15 wherein one of said first plurality of fingers has an elbow and an extension extending upwardly at an angle from said elbow.

19. The gas turbine engine seal of claim 18 wherein said extension has a radially outer non-flat surface.

20. The gas turbine engine seal of claim 18 wherein said extension terminates in a curvilinear shape.

21. The gas turbine engine seal of claim 15 wherein said second surface is a polytetrafluoroethylene-based fabric.

22. The gas turbine engine seal of claim 15 wherein said second surface is a polytetrafluoroethylene-based fabric that is bonded to one of said one of said plurality of fingers or said seal land in register with an elbow of said plurality of fingers.

23. The seal of claim 15 wherein said second duct translates in an axially direction relative to said first duct.

24. The seal of claim 15, wherein said second duct is located radially inward from a downstream end of said first duct relative to a longitudinal axis of the first duct and a radially inner surface of said second duct forms a boundary defining an exhaust gas path.

* * * * *